Figure 1:
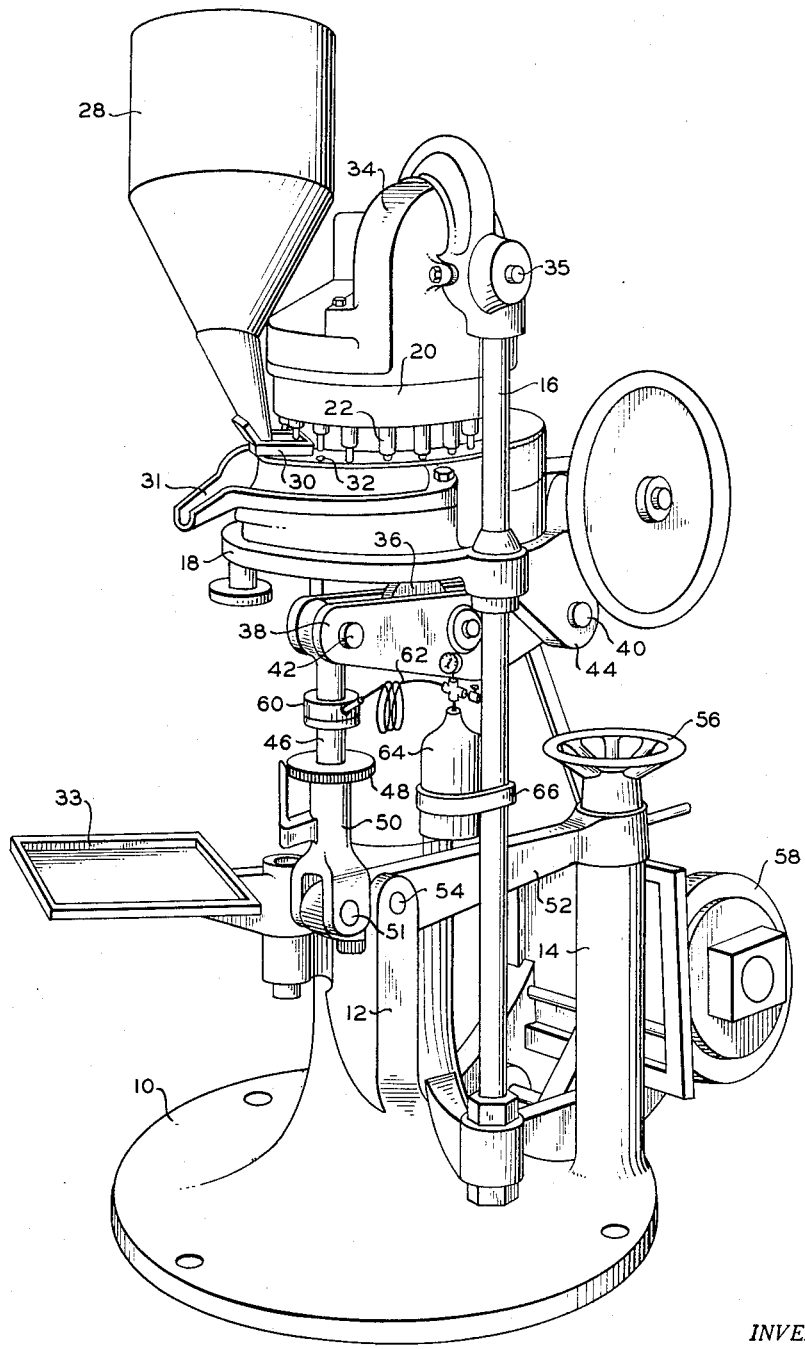

Jan. 19, 1960 E. W. PITZER 2,921,339
ROTARY MOLDING MACHINE AND METHOD OF MOLDING
Filed Sept. 20, 1956 2 Sheets-Sheet 1

INVENTOR.
E. W. PITZER
BY *Hudson & Young*
ATTORNEYS

Jan. 19, 1960  E. W. PITZER  2,921,339
ROTARY MOLDING MACHINE AND METHOD OF MOLDING
Filed Sept. 20, 1956  2 Sheets-Sheet 2

INVENTOR.
E. W. PITZER
BY
Hudson & Young
ATTORNEYS

2,921,339

ROTARY MOLDING MACHINE AND METHOD OF MOLDING

Emory W. Pitzer, Bartlesville, Okla., assignor to Phillips Petroleum Company, a corporation of Delaware Application September 20, 1956, Serial No. 611,062

13 Claims. (Cl. 18—20)

This invention relates to a molding process and machine for molding compactable particulate or powdered solids. A specific aspect of the invention pertains to rotary tabletting machines.

In the manufacture of compressed tablets from powdered materials with conventional machines, strength and porosity of tablets of the same powder vary over a wide range. Elimination or reduction of these variations would increase the value of the tablets produced, e.g., catalyst tablets where both strength and porosity affect activity. An automatic pressure regulator to control the force exerted on the tablet at the time of formation as a method of eliminating these undesirable deviation is provided by the invention.

Tablets are manufactured in conventional machines by (1) filling the cylinder of a die (e.g., ⅛" I.D., x ¾" long) with powder, (2) inserting punches into both ends of the cylinder, (3) pressing the punches to compact the powder into a tablet, (4) removing one punch from the die, and (5) ejecting the tablet from the die by forcing the remaining punch through the die. Machines are commercially available which perform these operations at high speeds.

In the production of tablets by this compression process, operations 1 and 3 are primarily responsible for deviations in crushing strength and porosity. In operation 1 powder flows into the cylinder of the die when the empty die passes under a feed frame filled with powder. The quantity of powder which flows into the die varies as the flow characteristic of the powder changes. This variation in quantity of powder produces a change in the compression force exerted on the punches in operation 3. This change occurs because large quantities of powder increase the required distance between the punches for uniform compaction and small quantities decrease this distance. In conventional machines, this distance is not allowed to vary, consequently, tremendous differences in force exerted on the tablet result. These differences in force produce variations in tablet strength and porosity. In addition, it is virtually impractical to use a set of punches—frequently as many as 66 in large machines— which are exactly the same length. Normally-experienced differences in punch lengths introduce further deviations in force applied to the tablet.

Accordingly it is an object of the invention to provide an improved molding machine that accurately and automatically regulates the pressure applied to the material in the mold. Another object is to provide an improved molding machine which produces uniformly compacted articles. Another object is to provide a method of tabletting or pelleting powdered material into small shapes of uniform compactness and porosity. It is also an object of the invention to provide a method of pelleting catalyst powders into pellets or tablets of uniformly high activity. Other objects of the invention will become apparent from a consideration of the accompanying disclosure.

The invention comprises a process and means for eliminating or reducing the variations in tablet strength and porosity normally obtained with commercial tabletting machines thru the use of an automatic flexible pressure regulator which is adjustable to any suitable constant pressure. The regulator of the invention may be readily installed in the force system in a commercially available tabletting machine and has been used successfully for a substantial period of time on the Stokes BB-2 tabletting machine. While either liquids or gases may be utilized in the flexible pressure linkage, the use of gases is preferred. Nitrogen has been used successfully but any non-deleterious gas is operable.

Figure 3:
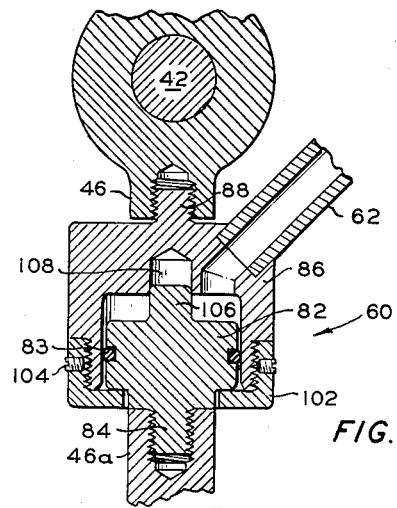
Figure 4:
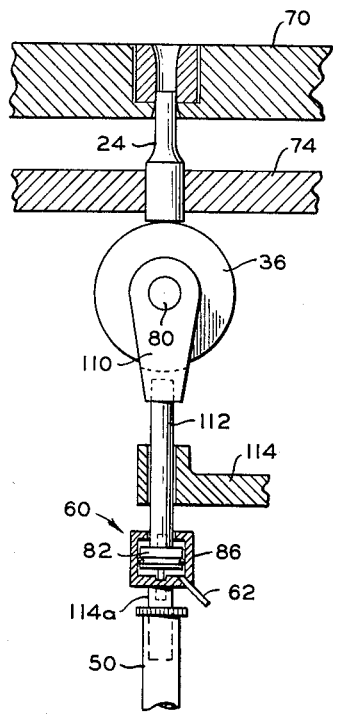
Figure 2:
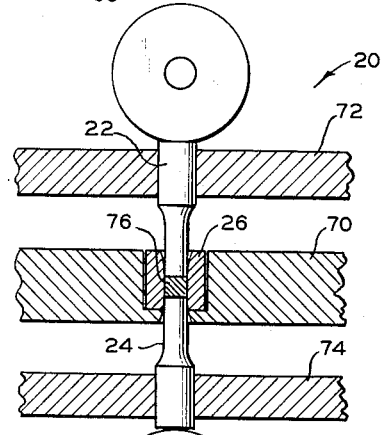
Figure 2:
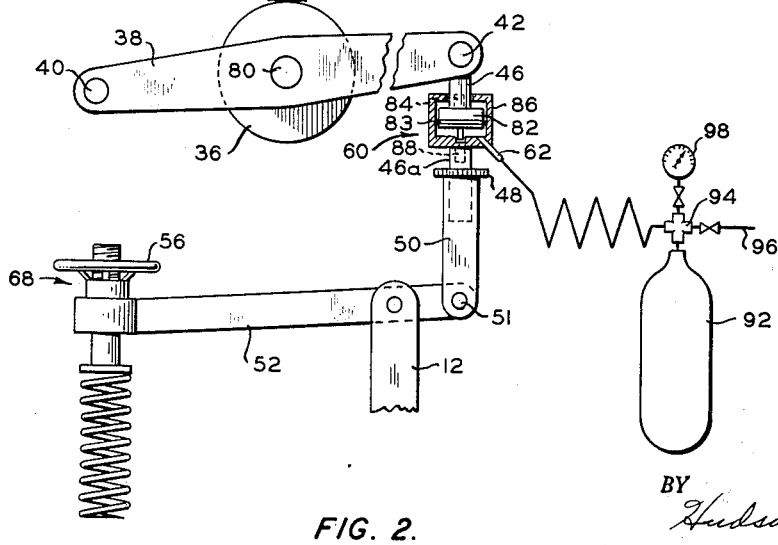

To illustrate the invention, reference is made to the accompanying drawing in which Figure 1 is a perspective view of a Stokes BB-2 tabletting machine supplied by F. J. Stokes Machine of Philadelphia, Pennsylvania; Figure 2 is a schematic elevational view showing essential elements or parts of the machine of Figure 1; Figure 3 is a vertical cross section of a fluid actuated cylinder for use in the structure of Figures 1, 2 and 4; and Figure 4 is a schematic elevation of a preferred embodiment of essential elements of a molding or tabletting machine. Corresponding parts of the various figures are correspondingly designated.

Referring to Figure 1 the machine comprises a base 10 supporting standards 12, 14, and 16 which serve to support various operating parts of the machine. Standard 16 supports a fixed table 18 having a central spindle on which a rotating head 20 is positioned. Head 20 is of such construction that a number of rings or annular discs are superimposed with smaller rings with necks in between forming a structure of several stories and of diameters to suit the coacting mechanism. A plurality of vertical apertures are spaced around the head and cut clear thru the several stories to form bearings and seats for a series of upper punches 22, lower punches 24 (not shown in Figure 1 but seen in Figure 2) and molds 26 (likewise, shown in Figure 2). These punches (both upper and lower) are made to operate by cam tracks enclosed within the machine of Figure 1 but not shown therein. A feed hopper 28 feeds powdered material into a feeding means 30 which feeds powdered material into openings 32 of the mold when punches 22 are withdrawn to their uppermost position. Compression of the material in the molds is effected by forcing the upper and lower punches together in the mold by means of upper and lower compression rollers. Tablets are ejected into chute 31 for delivery into a receptacle positioned on support bracket 33. The upper compression roller is positioned in housing 34 on spindle 35 and the lower roller 36 is positioned in lever 38 pivoted at shaft 40 and at shaft 42. Shaft 40 is fixed, being inserted in bracket 44 which is rigidly attached to table 18. Pivot 42 is supported by a shaft 46 which connects by means of adjustable element 48 with a rod and clevis arrangement 50. Element 50 is pivoted on arm or lever 52 which in turn is supported or pivoted on pin 54 positioned in standard 12. Arm or lever 52 is a portion of a safety release mechanism. Hand wheel 56 operates pressure adjustment means (not shown) within standard 14 which can be varied to adapt the machine to various suitable pressures within the limits of the machine. Means for operating the machine, such as a motor is shown at 58.

In the operation of the machine, as commercially available, adjustment of wheels 48 and 56 fix the position of lower compression roller 36 so that little or no variation in the position of the roller is possible except under emergency conditions which operate safety release lever 52. When different amounts of powdered material are delivered to the dies in the rotating head because of variations in flowability of powder or for other reasons, the same movement of the punches is provided so that the space between punches is substantially the same in each die and therefore the compacting pressures on the different masses in the dies varies considerably. In order to correct this disadvantage or inadequacy in the machine and provide for relatively constant pressure, regardless of the varying amounts of material in the die, I have devised a fluid cylinder arangement 60 positioned in shaft 46 which is connected by conduit 62 with a surge vessel 64 attached by band 66 to standard 16. Fluid cylinder 60 cushions the pressure applied to the lower punches as table 20 rotates and brings the upper and lower punches together with their cooperating die or mold in line with lower compression roller 30 and the upper compression roller in housing 34. In this manner variation in the masses of material in the dies is compensated by a slight variation in the position of the piston in fluid cylinder 60 which has negligible effect on the fluid pressure because of the relatively large volume of fluid in line 62 and surge vessel 64 as compared with the volume effect on the fluid pressure because of the relatively large volume of fluid in line 62 and surge vessel 64 as compared with the volume of displacement effected by the slight movement of the piston. A better understanding of this principle of the invention will be had from study of Figure 2 which is discussed below.

Figure 2 shows diagrammatically an arrangement of a fluid cylinder 60, lower compression roller 36, shaft 46, rod and clevis arrangement 50, safety lever 52 and emergency release assembly 68. This figure also shows the positional arrangement of upper punches 22, lower punches 24, and mold or die 26 in disc 70 which is an element of rotary head 20. Upper punches 22 operate in guide slots in disc 72 and lower punches 24 operate in guide slots in disc 74. Discs 72 and 74 are fixed or attached to disc 70, being also a portion of head 20 and rotating as a unit. Compacted material 76 is shown between the punches in die 26.

Lower compression roller 36 is positioned on axle 80 which extends between the parallel members of lever 38. Pin 40 is fixed as shown in Figure 1 and the opposite end of the lever 38 is pivoted by means of pin 42 in shaft 46. Since pin 51 is fixed for any given pressure setting of hand wheel 48, the linkage system comprising elements 50, 46, and lever 38 is rigid and does not allow for variations in the quantity of material 76 in die 26 without some yielding flexible member in the linkage. Fluid cylinder 60 comprises such a yielding element and assures constant pressure on the lower punches of the machine when properly designed to provide adequate fluid volume in the system. Fluid cylinder 60 includes piston 82 attached to shaft 46 by means of threaded element 84. Housing 86 encloses piston 82 is sealed arrangement by means of piston ring 83 with the walls thereof and is attached to element 46a by means of threaded member 88. Fluid supply line 62 extends thru housing 86 to the interior thereof and supplies fluid under pressure to the lower side of piston 82. Fluid supply line 62 connects with a surge vessel 92 thru a connection 94. A conduit 96 connected with a suitable source of fluid (not shown) leads into connector 94 and functions to build up the pressure in surge vessel 92 to any suitable value to which the fluid cylinder 60 is desired to be operated. Gauge 98 indicates the pressure in vessel 92 and in cylinder 60.

The practical application of fluid cylinder 60 to a commercial tabletting machine is effected by cutting out a section of rod 46, drilling and tapping the exposed ends of the rod and inserting or connecting fluid cylinder elements therewith as shown in Figure 2. As a practical matter it is essential that line 62 be of sufficient internal diameter to avoid any constriction in the fluid system which momentarily builds up pressure within cylinder 60 in order to avoid variation in the campacting pressure effected by the lower punches. In the application described line 62 was of ½" I.D. and surge vessel 92 was a high pressure bottle of one gallon capacity adapted to withstanding 3,000 p.s.i.

Referring to Figure 3, the arrangement shown therein is substantially the same as that shown in the fluid cylinder 60 of Figure 2 except that the piston 82 is connected with rod 46a while housing 86 is connected with rod 46 so that variations in mass of powdered material 76 effect vertical fluctuation of cylinder housing 86 instead of piston 82, as is the case in the arrangement of Figure 2. Piston ring 83 forms a fluid tight seal between the piston 82 and housing 86. Housing 86 is threaded to an end cap 102. Set screws 104 prevent unthreading of cap 102 during operation of the device. Cylindrical extension 106 on piston 82 operates in guide slot 108 to maintain alignment of the piston and cylindrical wall of housing 86.

Referring to Figure 4 the arrangement of the device shown is the same above lower compression roller 36 as that illustrated in Figures 1 and 2. The structure below roller 36 is substantially different in that the lever arrangement of the conventional apparatus or machine is eliminated. A clevis 110 supports axle 80, directly, and in turn is supported by shaft or rod 112 which passes thru guide 114 (attached to the base of the machine) and connects directly with piston 82 in fluid cylinder 60. The balance of the apparatus is similar to that of Figures 1 and 2, support column 50 being attached directly to the base of the machine and support rod 114a being supported in the same manner as in the previously described machines. The embodiment of the invention shown in Figure 4 has advantages over the machine shown in Figures 1 and 2 (commercial machines) in that elimination of the lever and linkage system is effected while providing more efficient operation compared to the more cumbersome machines. It is found that there is no necessity for the emergency release assembly of conventional machines because of the flexibility of the fluid linkage comprising cylinder 60 and its fluid system.

The invention has been utilized over a substantial period in the compacting of powdered catalytic materials to produce tablets or pellets which are substantially uniform in porosity and compactness with any given pressure setting or adjustment of the fluid cylinder and mechanism attached thereto. It has been found that there is a close relationship between pellet or tablet porosity and catalyst activity. It is well recognized that more porous pellets are more active catalysts and, therefore, unduly compacting the tablets or pellets to strengths which are greater than are required in use in catalyst beds results in lower catalyst activity. With commercial tabletting apparatus available before the invention, it was necessary to adjust the operating pressure of the machine to obtain pellets of greater average strength than would normally be required because of the wide range of strengths of the pellets produced by the machine due to the exact spacing of the punches in every pelleting operation, regardless of the amount of powdered material introduced to the molds. With the present invention very careful and accurate adjustment of the pellet or tabletting pressure is automatically provided and it is not necessary to allow a margin of safety in the strength of the pellets or tablets produced by the invention and, therefore, more porous and more active pellets, meeting strength requirements, are readily produced by the process and machine of the invention.

To illustrate the invention, powdered alumina trihydrate frequently utilized in catalyst pellets was tabletted in a Stokes BB-2 machine as commercially available and also in the same machine modified by the invention in accordance with the preceding disclosure. The machine was set to compact the powder fed into the dies to a length of 0.125". Tablets of different lengths frequently experienced in commercial operations were produced with each machine by varying the amount of powder fed to the dies while the compression force adjustment remained constant. Crushing strengths of the tablets were obtained by standard methods. Typical data obtained are presented in the table below.

Table

| Regular Machine—Pill | | Automatic Machine—Pill | |
|---|---|---|---|
| Length, in. | Strength, lbs. | Length, in. | Strength, lbs. |
| 0.113 | 3.5 | 0.111 | 8.0 |
| 0.125 | 9.5 | 0.124 | 9.0 |
| 0.140 [1] | 10.0 | 0.140 | 10.0 |

[1] Punches were damaged producing this length pill.

The above data indicate the more uniform crushing strength and hence porosity of tablets made with the automatic pressure control of the invention as compared with tablets made with machines commercially available.

The principal discussion herein has related to the tabletting or pelleting of powdered catalytic material however the process and apparatus disclosed are also applicable to the molding or compacting of any compactable finely comminuted material such as adsorbents, ceramics, powdered metals, etc.

Certain modifications of the invention will become apparent to those skilled in the art and the illustrative details disclosed are not to be construed as imposing unnecessary limitations on the invention.

I claim:

1. A molding machine comprising in combination a pair of opposed rollers at least one of which is supported in a flexible linkage including a compressed gas actuated cylinder adapted to apply a substantially constant pressure on said at least one roller; a die adapted to rotate between said rollers; and a pair of opposed punches cooperative with said die in compacting and molding material therein and compressively actuated by said rollers upon rotation of said die therebetween.

2. The machine defined by claim 1 including a closed surge vessel connected by conduit means to said cylinder to provide a relatively constant gas pressure in said cylinder.

3. A tabletting machine comprising in combination a first compression roller on a fixed axis; a second compression roller on a yieldable axis spaced from said first roller; a die rotatable between aforesaid rollers carrying a pair of opposed punches urged toward each other endwise when passing between said rollers so as to compress material in said die; a gas-pressure-actuated cylinder flexibly supporting said second roller against the end of the adjacent punch; and means for maintaining relatively constant fluid pressure in said cylinder.

4. The machine defined in claim 3 wherein said cylinder is connected by a gas line to a closed surge vessel so that variations in the movement of said cylinder under punch pressure result in relatively constant pressure in said cylinder.

5. A tabletting machine comprising in combination a base having supported thereon a horizontally rotatable head carrying a series of upper punches, a corresponding series of opposed lower punches, and a corresponding series of molds, said punches being movable vertically in pairs into the corresponding die; means for rotating said head; a pair of opposed compression rollers at least one of which is supported on said base in a flexible linkage including a compressed gas-actuated cylinder, said rollers being spaced above and below said punches so as to actuate same when said head rotates same between said rollers; means for withdrawing the upper punches from said molds during a portion of a revolution; means for filling said molds when said punches are removed; and means for removing molded material.

6. The machine of claim 5 including a closed surge vessel connected by conduit means with said cylinder.

7. The machine of claim 5 wherein said cylinder is positioned in a direct support for the axle of one of said rollers.

8. The machine of claim 5 wherein said cylinder is positioned in a lever linkage supporting one of said rollers.

9. A method of forming uniformly compacted molded articles from particulate comminuted solids which comprises compressing said solids in a mold by applying pressure thru punches from opposite sides of the mold; and assuring uniformity of pressure by cushioning the force applied on at least one of said punches on a sufficient volume of confined compressed gas to assure substantially uniform pressure on said solids with variable amounts of solids in said mold.

10. The process of claim 9 wherein said fluid comprises nitrogen.

11. A method of forming uniformly compacted catalyst pellets which comprises introducing finely comminuted catalyst particles into a mold open at opposite ends; compacting said particles in said mold by applying pressure thereon thru punches inserted into each end of said mold; and applying uniform pressure on at least one of said punches by cushioning the force applied thereon on an enclosed mass of compressed gas.

12. The machine of claim 1 wherein said linkage comprises a cylinder having a movable piston therein; a gas inlet in said cylinder on one side of said piston for ingress and egress of pressure gas; a resistance arm connected to one of said piston and said cylinder; a pressure linkage between said one of said rollers and the other of said piston and said cylinder.

13. The machine of claim 12 including a pressure surge vessel connected with said gas inlet.

References Cited in the file of this patent
UNITED STATES PATENTS

| 1,698,852 | Miller et al. | Jan. 15, 1929 |
| 1,803,814 | Spengler et al. | May 5, 1931 |
| 2,798,443 | Martell | June 9, 1957 |